(12) United States Patent
Zueger et al.

(10) Patent No.: US 11,267,490 B2
(45) Date of Patent: Mar. 8, 2022

(54) COOLING SYSTEM AND METHOD FOR A DUAL-POWERED RAILROAD VEHICLE

(71) Applicant: HITACHI ENERGY SWITZERLAND AG, Baden (CH)

(72) Inventors: Harry Zueger, Geneva (CH); Yann Cuenin, Saint-Martin (CH); Yoann Alphand, Fegersheim (FR)

(73) Assignee: Hitachi Energy Switzerland AG, Baden (CH)

( * ) Notice: Subject to any disclaimer, the term of this patent is extended or adjusted under 35 U.S.C. 154(b) by 441 days.

(21) Appl. No.: 16/225,202

(22) Filed: Dec. 19, 2018

(65) Prior Publication Data

US 2019/0185023 A1 Jun. 20, 2019

(30) Foreign Application Priority Data

Dec. 19, 2017 (EP) ..................................... 17208669

(51) Int. Cl.
| | |
|---|---|
| *B60L 53/14* | (2019.01) |
| *B61C 5/02* | (2006.01) |
| *B61C 7/04* | (2006.01) |
| *F01P 5/12* | (2006.01) |
| *F01P 7/16* | (2006.01) |
| *B61C 17/04* | (2006.01) |
| *F01P 3/20* | (2006.01) |

(52) U.S. Cl.
CPC ................ *B61C 5/02* (2013.01); *B61C 7/04* (2013.01); *B61C 17/04* (2013.01); *F01P 3/20* (2013.01); *F01P 5/12* (2013.01); *F01P 7/161* (2013.01); *F01P 7/165* (2013.01); *F01P 2005/125* (2013.01); *F01P 2050/24* (2013.01)

(58) Field of Classification Search
CPC .. B60L 2200/26; B60L 2240/36; B60L 53/14; B60L 58/26; B61C 5/02; B61C 5/00; B61C 7/04; B61C 17/00; B61C 9/24
See application file for complete search history.

(56) References Cited

U.S. PATENT DOCUMENTS

| 5,255,733 A | 10/1993 | King |
|---|---|---|
| 2011/0315043 A1 * | 12/2011 | Kumar ...................... B60L 9/28 105/35 |

(Continued)

FOREIGN PATENT DOCUMENTS

| DE | 202008018278 U1 * | 7/2012 | ............. B60L 50/13 |
|---|---|---|---|
| EP | 0578549 A1 | 1/1994 | |

(Continued)

OTHER PUBLICATIONS

Google translation of DE-202008018278-U1 (Year: 2012).*

(Continued)

*Primary Examiner* — Long T Tran
(74) *Attorney, Agent, or Firm* — Sage Patent Group

(57) ABSTRACT

A dual-powered railroad vehicle is provided. The vehicle includes a combustion engine having a first cooling circuit; a traction transformer having a second cooling circuit; and at least one radiator for dissipating thermal energy to surrounding air. The first cooling circuit and the second cooling circuit are configured to dissipate thermal energy via the at least one radiator. Further, a method for operating a dual-powered railroad vehicle is provided.

20 Claims, 1 Drawing Sheet

(56) References Cited

U.S. PATENT DOCUMENTS

| | | | |
|---|---|---|---|
| 2013/0000508 A1* | 1/2013 | Matthys | F02D 29/06 |
| | | | 105/35 |
| 2013/0099561 A1* | 4/2013 | Raman | B60L 58/27 |
| | | | 307/9.1 |
| 2014/0124170 A1 | 5/2014 | Young et al. | |
| 2016/0244072 A1* | 8/2016 | Biagini | F02D 41/024 |
| 2017/0074130 A1* | 3/2017 | Leone | B60L 3/0046 |
| 2017/0106883 A1* | 4/2017 | Shubs, Jr | B61L 15/0081 |
| 2017/0253255 A1* | 9/2017 | Crecelius | B61C 5/00 |
| 2018/0162382 A1* | 6/2018 | Colavincenzo | B60W 10/06 |
| 2018/0328157 A1* | 11/2018 | Bishop | E21B 43/26 |

FOREIGN PATENT DOCUMENTS

| | | |
|---|---|---|
| EP | 2689983 A1 | 1/2014 |
| JP | 2009067087 A | 4/2009 |

OTHER PUBLICATIONS

European Patent Office, Extended Search Report issued in corresponding Application No. 17208669.6, dated Jun. 4, 2018, 9 pp.

* cited by examiner

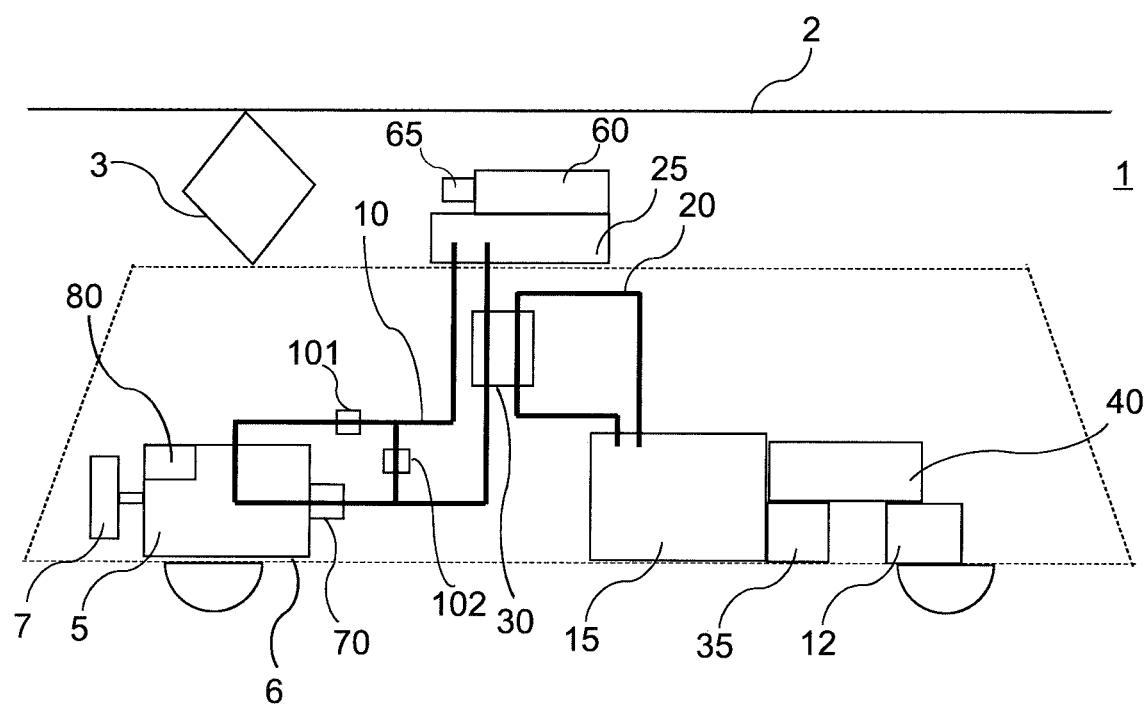

COOLING SYSTEM AND METHOD FOR A DUAL-POWERED RAILROAD VEHICLE

FIELD

Aspects of the present disclosure relate to a railroad vehicle having an electric motor and a traction transformer fed from an electric grid, as well as a combustion engine, such vehicle being known as a dual-powered railway vehicle. In particular, aspects pertain to a cooling system and method for effectively and economically dissipating the heat produced by the combustion engine and the traction transformer of such a dual-powered railroad vehicle.

TECHNICAL BACKGROUND

On contrary to many other transformer types (distribution transformers, power transformers etc.) which are naturally cooled, traction transformers in railroad vehicles typically require a pump to ensure forced liquid cooling of the windings, and a cooling system composed of a heat exchanger and fans to ensure forced air cooling of the cooling liquid, typically oil. The produced amount of heat is typically significant, as traction transformers typically exhibit higher relative losses than other types of large power transformers. The reason behind this difference is that traction transformers are specified with much higher power densities than other types of transformers, since they are embedded in trains, with very limited available volume and with weight restrictions. As a consequence, smaller core sections and wire sections are used in order to downsize both core and windings. Reduced core section results in increased number of turns and thus wire length, which in combination with higher current density of the turns results in significantly higher transformer losses. An exemplary efficiency range of a traction transformer may be regarded to range from about 89% to about 97%.

Hence, a significant amount of heat has to be dissipated from such transformers, which at the same time have a very compact form factor. In view of the above, traction transformers cannot be cooled naturally, which is why an active cooling including a cooling liquid, a pump, heat exchangers and fans are typically necessary to enable efficient cooling. Similar problems arise with other electric power conversion devices used in railroad vehicles, such as e.g. semiconductor-based switching units for the electric motors, which also produce a significant amount of thermal energy whilst having a compact form factor, and thus also require active cooling. As a consequence, the cooling system for a traction transformer (and if present, a reactor) is typically relatively elaborate and costly.

On the other hand, in a dual powered railway vehicle, the combustion engine also produces an even significantly greater amount of thermal energy to be dissipated, as such large Diesel engines have an efficiency of about 40% at best, thus releasing significantly more heat or thermal power than the installed mechanical power. Therefore, typically, a water-based or oil-based cooling system (cooling circuit) with a radiator and at least one fan is installed.

In view of the above and for other reasons, there is a need for the present invention.

SUMMARY OF THE INVENTION

In view of the above, a dual-powered railroad vehicle according to claim 1, and a method for operating a dual-powered railroad vehicle according to claim 15 are provided.

According to a first aspect, a dual-powered railroad vehicle is provided. It comprises a combustion engine having a first cooling circuit; a traction transformer having a second cooling circuit; and at last one radiator for dissipating thermal energy to surrounding air. The first cooling circuit and the second cooling circuit are configured to dissipate thermal energy via the at least one radiator.

According to a second aspect, a method for operating a dual-powered railroad vehicle is provided. The method includes dissipating heat from a combustion engine with a first cooling circuit; and/or dissipating heat from a traction transformer with a second cooling circuit, wherein heat from the combustion engine and from the traction transformer is dissipated via at least one radiator. Preferably, the first cooling circuit is thermally coupled to the second cooling circuit via a heat exchanger situated outside of the at least one radiator, and only coolant of the first cooling circuit flows through the at least one radiator.

Further advantages, features, aspects and details that can be combined with embodiments described herein are evident from the dependent claims, the description and the drawings.

Most trains and locomotives are fully electric powered, or use a Diesel motor as original energy provider. The invention pertains to vehicles which are called "dual-powered" and have both of these power sources. The Diesel engine, or more generally combustion engine, has a great amount of thermal energy to be removed mostly through a water-to-air heat exchanger. In such a dual-powered vehicle, the electrical equipment like the traction transformer has to be cooled, as well. Typically, a specific oil-, silicon- or ester-based cooling system is installed for the electrical installation, additionally to the cooling system for the Diesel engine, which are hence both contributing to space and weight consumption.

The invention proposes a new type of cooling system and method for operating or cooling a dual-powered railroad vehicle, which system and method at least partially combine features of both cooling systems and thus work for both systems. Herein for the first, advantage is taken from the fact that the Diesel propulsion is not running at the same time as the primary electrical supply, the main traction transformer and reactors. Hence, with a railroad vehicle according to embodiments, cost, weight and space are spared, amongst other advantages.

BRIEF DESCRIPTION OF THE FIGURES

More details will be described in the following with reference to the FIGURE, wherein FIG. 1 shows a cross-sectional view of a dual-powered railroad vehicle according to embodiments, which can be operated according to the method as described in embodiments.

DETAILED DESCRIPTION OF ASPECTS OF THE INVENTION

In the following, some aspects of the invention are described in detail. Aspects and parts of aspects are independent of each other and can be combined in any manner. For example, any aspect or embodiment described in this document can be combined with any other aspect or embodiment, as long as the combinations achieved are technically feasible, or unless the contrary is mentioned.

According to aspects described herein, the second cooling circuit is thermally coupled to the first cooling-circuit outside from the at least one radiator. In a further aspect, only coolant from the first cooling circuit flows through the at least one radiator.

According to aspects, the second cooling circuit is thermally coupled to the first cooling-circuit via a heat exchanger.

According to aspects, the first cooling circuit and the second cooling circuit are liquid-based.

According to aspects, the first cooling circuit comprises water or oil, and the second cooling circuit comprises an insulating fluid, preferably a natural oil and/or a synthetic oil and/or an ester oil.

According to aspects, the railroad vehicle further comprises a reactor and/or a semiconductor switching unit, which are in thermal connection to the second cooling circuit or with a third cooling circuit. The third cooling circuit is configured to dissipate thermal energy via the at least one radiator.

According to aspects, a part of the first cooling circuit, to which the second cooling circuit is thermally coupled, can be fluidly disconnected from the combustion engine during pure electric operation of the railroad vehicle.

According to aspects, the railroad vehicle further comprises at least one fan, which is electrically or hydrostatically driven, to circulate air through the at least one radiator.

According to aspects, at least one fan, employed during operation of the combustion engine for dissipating heat from the first cooling circuit, is electrically driven.

According to aspects, at least one fan, employed during operation of the combustion engine for dissipating heat from the first cooling circuit, is hydrostatically driven, and is optionally driven by an electrical oil pump.

According to aspects, the railroad vehicle further comprises an auxiliary coolant pump, which is preferably an electrical coolant pump, for pumping a coolant in at least a part of the first cooling circuit. Furthermore, a bypassing mechanism is provided to bypass a mechanically driven coolant pump of the combustion engine during pure electric operation of the railroad vehicle.

According to aspects, during pure electric operation of the railroad vehicle, either:
  the coolant in the first cooling circuit circulates through the first cooling circuit via the same coolant flow path as during operation of the combustion engine, or
  the coolant in the first cooling circuit circulates only through a part of the first cooling circuit, compared to the coolant flow path during operation of the combustion engine.

According to aspects, during pure electric operation of the railroad vehicle, an engine block of the combustion engine is employed as a heat sink for thermal energy from the traction transformer, and optionally, a coolant flow to the at least one radiator is blocked in this mode of operation of the railroad vehicle.

According to aspects, the railroad vehicle further comprises a controllably movable cover or hatch. During pure electric operation of the railroad vehicle, at least a part of the at least one radiator is covered by the cover or hatch. In such a mode of operation, an aerodynamic resistance of the railroad vehicle may be reduced during pure electric operation.

DETAILED DESCRIPTION OF THE FIGURES AND EXEMPLARY EMBODIMENTS

With respect to the drawings, only parts differing to a previously described embodiment or drawing are explicitly mentioned or described.

Although specific features of various embodiments of the invention may be shown in some drawings or drawing parts and not in others, this is for convenience only. In accordance with the principles of the invention, any feature of a drawing may be referenced and/or claimed in combination with any feature of any other drawing or drawing part. As a general remark, FIG. 1 shows a number of aspects and embodiments combined in one FIGURE, wherein the single aspects and embodiments shown therein may also be realized alone or in combinations with others. This becomes apparent from the remainder of the application and the claims.

FIG. 1 shows a dual-powered railroad vehicle 1. It comprises a combustion engine 5, typically a Diesel engine. The combustion engine 5 has a first cooling circuit 10, with which thermal energy is transported to a radiator 25. The radiator 25 is typically arranged on a roof section or underfloor section of the railroad vehicle 1. The railroad vehicle 1 further has an electric motor(s) 12 (which is typically also, intermittently, operated as a generator). The electric motor(s) 12 is (or are) fed, during pure electric operation of the railroad vehicle 1, by a traction transformer 15 and via an power electronic traction converter 40 electrically connected with a pantograph 3 to an overhead line 2 (electrical connections inside vehicle not shown for illustrational purposes). The traction transformer 15 has a second cooling circuit 20. The at least one radiator 25 is provided for dissipating thermal energy to surrounding air, and works as a common radiator for thermal energy from the combustion engine 5 and from the traction transformer 15. For this purpose, the first cooling circuit 10 and the second cooling circuit 20 are configured to both dissipate thermal energy via the at least one radiator 25. This is, according to embodiments, achieved by thermally coupling the first cooling circuit 10 to the second cooling circuit 20, typically via a heat exchanger 30. Typically, but not necessarily, the railroad vehicle 1 further comprises an electric generator 7 connected to the power electronic traction converter 40, which is mechanically driven by the combustion engine 5. The electricity generated by the electric generator 7 may be used to drive the electric motor(s) 12 (e.g. during Diesel electric operation of the railroad vehicle, e.g., in absence of an overhead line for feeding the traction transformer).

The heat exchanger 30 can be located outside or outwards from the at least one radiator 25. Hence, only coolant from the first cooling circuit 10 flows through the at least one radiator 25, while heat from the second cooling circuit 20 is thermally coupled into the first cooling circuit.

Typically, but not necessarily, both the first cooling circuit 10 and the second cooling circuit 20 contain a liquid coolant and are thus liquid-based. Further, even more preferred, the first cooling circuit 10, for the combustion engine 5, comprises water or oil. The second cooling circuit 20 for the traction transformer 15 comprises an insulating fluid. This may be a natural oil, and/or a synthetic oil, and/or an ester oil, and/or a silicon oil, or mixtures any of these.

In some embodiments, the railroad vehicle 1 further comprises an (optional) reactor 35, and a power electronic traction converter 40 for controlling the electric motor(s) 12. The reactor 35 and/or the power electronic traction converter 40 may also be in thermal connection to the second cooling circuit 20 (connection not shown). They may also be thermally connected to a third (typically oil-, silicon- or ester-based) cooling circuit (not shown in FIG. 1). The third cooling circuit is also configured to dissipate thermal energy via the at least one radiator 25, and may therefore also be connected to the heat exchanger 30.

The part of the first cooling circuit 10, to which the second cooling circuit 20 is thermally coupled, may in some embodiments be fluidly disconnected from the combustion engine 5 during pure electric operation of the railroad vehicle 1. Thus, only a part of the first cooling circuit 10 is used during electric operation of the vehicle. This may be achieved by opening or closing valves 101, 102 in the first cooling circuit 10, with which a part of the first cooling circuit 10 may be separated, so that, e.g., the part of the cooling circuit 10 running through combustion engine 5 may be excluded, respectively may be bypassed by the coolant.

Further, at least one fan 60 may be provided, which is electrically or hydrostatically driven to circulate air through the at least one radiator 25. When the fan 60 is hydrostatically driven, it may be driven by an electrical oil pump 65, as the combustion engine 5 is at a standstill in this mode.

Furthermore, an auxiliary coolant pump 70 may be optionally provided in embodiments. It is preferably an electrical coolant pump for pumping a coolant in at least a part of the first cooling circuit 10. This may be used during electric operation of the vehicle, when the first cooling circuit 10 shall be used, though the mechanical coolant pump 80 of the combustion engine 5 is at standstill. Also, a bypassing mechanism may be used to bypass a mechanically driven coolant pump 80 of the combustion engine 5 during pure electric operation of the railroad vehicle 1.

According to some embodiments, during pure electric operation of the railroad vehicle 1, either one of the following modes is possible:

The coolant in the first cooling circuit 10 circulates through the first cooling circuit 10 via the same coolant flow path as during operation of the combustion engine 5.

The coolant in the first cooling circuit 10 circulates only through a part of the first cooling circuit 10, compared to the coolant flow path during operation of the combustion engine 5.

Further, according to some further embodiments, during pure electric operation of the railroad vehicle 1, an engine block 6 of the combustion engine 5 is employed as a heat sink for thermal energy from the traction transformer 15. In this case, optionally, a coolant flow through the at least one radiator 25 may be partially, or even fully, blocked. Hence, the whole thermal energy produced by the traction transformer (and reactor/switching unit) is dissipated into the engine block 6. As the block has a high capacity for thermal energy, the vehicle may run for a significant time without even using the radiator 25, or the fan 60. Hence, the radiator may in this case even be covered or hidden, in order to improve air flow in a roof/underfloor section. Hence, a controllable, movable cover or hatch may be provided, wherein during pure electric operation of the railroad vehicle 1, at least a part of the at least one radiator 25 is then covered by the cover or hatch. This may be provided, e.g. such that the radiator is completely covered by a part of the body of the vehicle 1. Hence, aerodynamic resistance of the railroad vehicle 1 may drastically be reduced and energy consumption be optimized.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims, if they have structural elements that do not differ from the literal language of the claims, or if they include equivalent structural elements with insubstantial differences from the literal language of the claims.

The invention claimed is:

1. A dual-powered railroad vehicle, comprising:
a combustion engine having a first cooling circuit;
a traction transformer operatively coupled to an electric grid to provide power to the dual-powered railroad vehicle during pure electric operation of the dual-powered railroad vehicle, the traction transformer having a second cooling circuit;
at least one radiator for dissipating thermal energy to surrounding air,
wherein the first cooling circuit and the second cooling circuit are configured to dissipate thermal energy via the at least one radiator.

2. The railroad vehicle of claim 1, wherein the second cooling circuit is thermally coupled to the first cooling circuit outside from the at least one radiator, and wherein preferably, only coolant from the first cooling circuit flows through the at least one radiator.

3. The railroad vehicle of claim 1, wherein the second cooling circuit is thermally coupled to the first cooling circuit via a heat exchanger.

4. The railroad vehicle of claim 1, wherein the first cooling circuit- and the second cooling circuit are liquid-based.

5. The railroad vehicle of claim 1, wherein the first cooling circuit comprises water or oil, and wherein the second cooling circuit comprises an insulating fluid.

6. The railroad vehicle of claim 5, wherein the insulating fluid comprises a natural oil and/or a synthetic oil and/or an ester oil and/or Silicon oil.

7. The railroad vehicle of claim 1, further comprising a reactor and/or a power electronic traction converter, being in thermal connection to the second cooling circuit or to third cooling circuit, which is configured to dissipate thermal energy via the at least one radiator.

8. The railroad vehicle of claim 1, wherein a part of the first cooling circuit, to which the second cooling circuit is thermally coupled, is fluidly disconnected from the combustion engine during pure electric operation of the railroad vehicle.

9. The railroad vehicle of claim 1, further comprising at least one fan, which is electrically or hydrostatically driven, to circulate air through the at least one radiator.

10. The railroad vehicle of claim 1, wherein at least one fan, employed during operation of the combustion engine for dissipating heat from the first cooling circuit, is electrically driven.

11. The railroad vehicle of claim 1, wherein at least one fan, employed during operation of the combustion engine for dissipating heat from the first cooling circuit, is hydrostatically driven.

12. The railroad vehicle of claim 11, wherein the at least one fan is driven by an electrical oil pump.

13. The railroad vehicle of claim 1, further comprising an auxiliary coolant pump, which is preferably an electrical coolant pump, for pumping a coolant in at least a part of the first cooling circuit.

14. The railroad vehicle of claim 13, wherein the auxiliary coolant pump is an electrical coolant pump.

15. The railroad vehicle of claim 14, further comprising a bypassing mechanism to bypass a mechanically driven coolant pump of the combustion engine during pure electric operation of the railroad vehicle.

16. The railroad vehicle of claim 1, wherein during pure electric operation of the railroad vehicle, either:
- the coolant in the first cooling circuit circulates through the first cooling circuit via the same coolant flow path as during operation of the combustion engine, or
- the coolant in the first cooling circuit circulates only through part of the first cooling circuit, compared to the coolant flow path during operation of the combustion engine.

17. The railroad vehicle of claim 1, wherein during pure electric operation of the railroad vehicle, an engine block of the combustion engine is used as a heat sink for thermal energy from the traction transformer, wherein optionally coolant flow through the at least one radiator is partially, or preferably fully, blocked.

18. The railroad vehicle of claim 17, wherein during pure electric operation of the railroad vehicle, a coolant flow through the at least one radiator is at least partially blocked.

19. The railroad vehicle of claim 1, further comprising a controllably movable cover or hatch, wherein during pure electric operation of the railroad vehicle, at least a part of the at least one radiator is covered by the cover or hatch in a manner to reduce an aerodynamic resistance of the railroad vehicle.

20. A method for operating a dual-powered railroad vehicle, comprising:
- dissipating heat from a combustion engine with a first cooling circuit; and/or
- dissipating heat from a traction transformer with a second cooling circuit, the traction transformer operatively coupled to an electric grid to provide power to the dual-powered railroad vehicle during pure electric operation of the dual-powered railroad vehicle,
- wherein heat from the combustion engine and heat from the traction transformer is dissipated via at least one radiator, and wherein the first cooling circuit is thermally coupled to the second cooling circuit via a heat exchanger situated outside of the at least one radiator and wherein only coolant of the first cooling circuit flows through the at least one radiator.

* * * * *